United States Patent
Low et al.

(10) Patent No.: US 10,498,804 B1
(45) Date of Patent: Dec. 3, 2019

(54) LOAD BALANCING HADOOP DISTRIBUTED FILE SYSTEM OPERATIONS IN A NON-NATIVE OPERATING SYSTEM

(71) Applicants: Jacob Low, Seattle, WA (US); Steven Hubbell, Seattle, CA (US); David Tucker, Seattle, WA (US)

(72) Inventors: Jacob Low, Seattle, WA (US); Steven Hubbell, Seattle, CA (US); David Tucker, Seattle, WA (US)

(73) Assignee: EMC IP Holding Company LLC, Hopkinton, MA (US)

(*) Notice: Subject to any disclaimer, the term of this patent is extended or adjusted under 35 U.S.C. 154(b) by 375 days.

(21) Appl. No.: 15/197,673

(22) Filed: Jun. 29, 2016

(51) Int. Cl.
- *G06F 15/173* (2006.01)
- *H04L 29/08* (2006.01)
- *H04L 29/12* (2006.01)

(52) U.S. Cl.
CPC ...... *H04L 67/1002* (2013.01); *H04L 61/1505* (2013.01); *H04L 67/06* (2013.01); *H04L 67/1095* (2013.01); *H04L 67/1097* (2013.01)

(58) Field of Classification Search
CPC .................. G06F 21/6218; H04L 63/0236
See application file for complete search history.

(56) References Cited

U.S. PATENT DOCUMENTS

| | | | |
|---|---|---|---|
| 2013/0290463 A1* | 10/2013 | Myrah | G06F 3/0617 709/213 |
| 2015/0201036 A1* | 7/2015 | Nishiki | H04L 67/1095 709/224 |
| 2015/0222695 A1* | 8/2015 | Lee | H04L 61/103 709/201 |
| 2015/0248420 A1* | 9/2015 | Makkar | G06F 17/30088 707/649 |
| 2016/0306822 A1* | 10/2016 | Waghulde | G06F 17/30212 |
| 2018/0024853 A1* | 1/2018 | Warfield | G06F 9/45558 718/1 |

* cited by examiner

*Primary Examiner* — Umar Cheema
*Assistant Examiner* — Tesfu N Mekonen
(74) *Attorney, Agent, or Firm* — Krishnendu Gupta

(57) ABSTRACT

Implementations are provided herein for utilizing the two-part nature of HDFS protocol communications received in a non-native HDFS environment to use discriminative information learned in the NameNode request to make the client experience more efficient. NameNode requests can be received by any node among a cluster of nodes. It can be appreciated that in some non-native HDFS, clients can communicate with any node among a cluster of nodes to perform transactions and need not first communicate with a NameNode. In addition, any node among the cluster of nodes has access to any data within the HDFS. Thus, upon receiving a NameNode request, the non-native HDFS Cluster of Nodes can more effectively load balance the cluster by directing HDFS clients to connect with Nodes that are less busy than other nodes. In this sense, a more efficient client experience can be offered for HDFS clients within a non-native HDFS environment.

18 Claims, 6 Drawing Sheets

LOAD BALANCING HADOOP DISTRIBUTED FILE SYSTEM OPERATIONS IN A NON-NATIVE OPERATING SYSTEM

FIELD OF THE INVENTION

This invention relates generally to processing data, and more particularly to systems and methods for improving the performance of a Hadoop Distributed File System ("HDFS") calls in a non-HDFS operating system.

BACKGROUND OF THE INVENTION

Distributed file systems offer many compelling advantages in establishing high performance computing environments. One example is the ability to easily expand, even at large scale. The Hadoop Distributed File System ("HDFS") is a distributed file system, designed to run on commodity hardware, that stores data across a number of DataNodes. Not only is data stored across a number of DataNodes, individual files or objects are broken down into data blocks that can be stored and/or mirrored on different DataNodes. It can be appreciated that by replicating data across a number of DataNodes, the HDFS is more tolerant to hardware failure.

HDFS is a designed under a master/worker architecture. Each HDFS cluster consists of a single NameNode that acts as a master server that manages the file system namespace and regulates access to files by clients. A plurality of DataNodes operate as workers to the NameNode, usually configured one per node, that manage storage attached to the DataNode. Within the HDFS cluster, files are split into one or more blocks and these blocks are stored in the set of DataNodes. The NameNode controls operations like opening files, closing files, renaming files and directories, and mapping of blocks to DataNodes. The DataNodes then operate to serve read and write requests made by the clients of the HDFS. DataNodes also perform block creation, deletion, and replication based on instructions received from the NameNode.

In processing reads or writes, an HDFS client first makes a call to the NameNode to determine how to proceed. For example, in the context of a write, an HDFS client, some implementations, can cache the write data locally on the client in a temporary file. When the temporary file accumulates data over a certain a threshold, the client will contact the NameNode with the request to write data to the HDFS, the NameNode can insert the file name into the file system and allocate data blocks in DataNodes. The NameNode then responds to the client with the identity of the DataNode(s) and the destination data block address(es) where the write data will be stored in the HDFS. Similarly, for read requests, an HDFS client will first contact the NameNode to determine the DataNode and associated block addresses where the data is stored that is necessary to transact the read request. The client will then contact the DataNodes and request the data from the associated block addresses. In both instances, HDFS read requests and HDFS write requests, an HDFS client first contacts the NameNode with the overview of their request, and then waits for the NameNode to respond with the relevant information to continue processing the request.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a first part Hadoop Distributed File System ("HDFS") protocol request can be received, wherein the first part HDFS protocol request includes a request for a Data Node associated with asset of blocks associated with at least one file. A set of available IP addresses can be determined. Each IP address in the set of available IP addresses can be scored based on a number of active TCP connections on a node associated with each IP address. A subset of the set of available IP addresses can be determined based on a replication factor and the scoring. A response to the first part HDFS protocol request can be sent with the subset of the set of available IP addresses.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
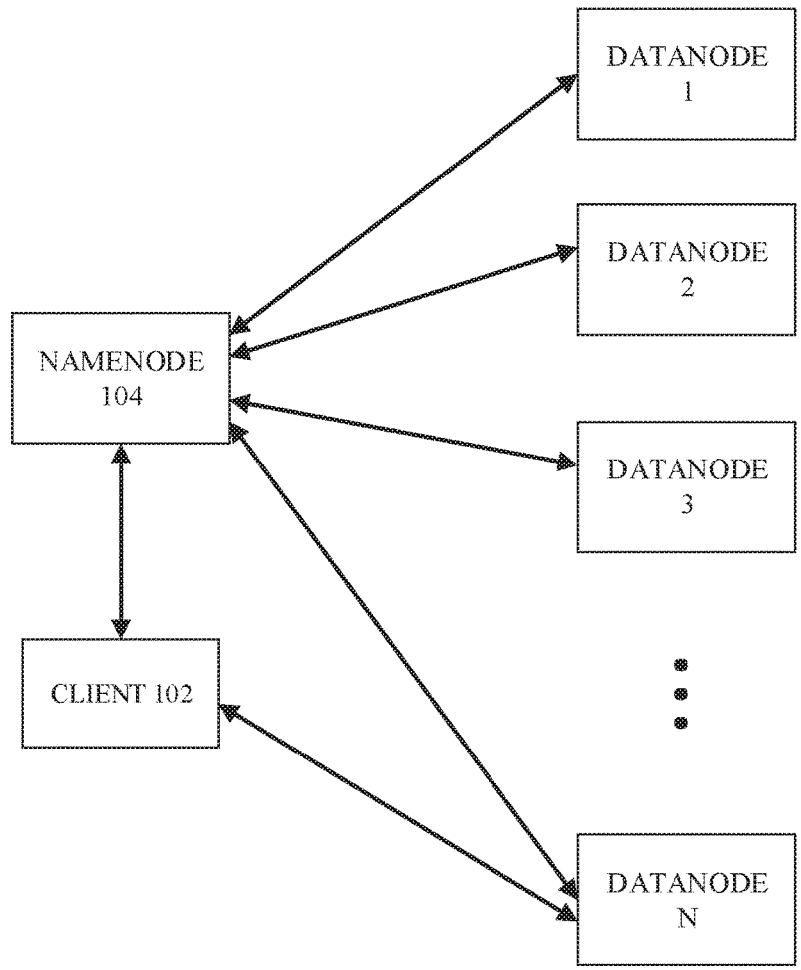
FIG. 1 illustrates an example of a native Hadoop Distributed File System in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

The term "access zone" or "zone" as used within this specification refers to a form of multi-tenancy that effectively partitions a single file system into trees that can act like distinct separate file systems to connected clients. Different access zones can have separate overlapping root directories, and can be affiliated with a distinct protocol. It can be appreciated that an admin access zone can be established for the root directory of the entire file system that can encompass all other access zones of the file system. Access zones can be associated with a set of unique IP addresses whereby clients connecting to the file system can be assigned an access zone based on the IP address of their connection. Access zones can be configurable to establish customizable authentication procedures, backup and recovery settings, data services, etc.

It can be appreciated that individual system calls need not be access zone aware to effectuate multi-tenancy. For example, an access daemon, such as a local security authority subsystem service ("LSASS") or a generic security subsystem that functions as an extension of the trusted computing base to handle authentication and identity, can assign access zone information to a token that is then assigned to an incoming network connection. The access daemon can then be used during each system call made by the incoming network connection to expose or deny access to network resources based on the zone information in the token assigned to the network connection. Along with an access daemon, in some implementations, other zone aware applications of an operating system can include network interface daemons such as those relating to server message block ("SMB") resources, NFS resources, Hadoop distributed file system ("HDFS"), and other network protocol or interface daemons depending on the functionality offered by the distributed file system. It can be appreciated that system calls and basic file system operating commands do not need to be access zone aware in implementations of the disclosure. Zone information becomes a container for file system configuration information. For example, where file system settings were in the past defined cluster wide, those settings can now be scoped instead to access zones. Daemons can then act on that information based on the access zone information within an associated token, and make configuration choices based on the information containing within the token.

Pending U.S. patent application Ser. No. 14/080,520 titled "Multi-Tenancy Based on Network Connection" is hereby incorporated by reference in full.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

Implementations are provided herein for utilizing the two-part nature of HDFS protocol communications received in a non-native HDFS environment to use discriminative information learned in the NameNode request to make the client experience more efficient. NameNode requests can be received by any node among a cluster of nodes. It can be appreciated that in some non-native HDFS, clients can communicate with any node among the cluster of nodes to perform transactions and need not first communicate with a NameNode. In addition, any node among the cluster of nodes has access to any data within the HDFS. Thus, upon receiving a NameNode request, the non-native HDFS Cluster of Nodes can more effectively load balance the cluster by directing HDFS clients to connect with Nodes that are less busy than other nodes. In this sense, a more efficient client experience can be offered for HDFS clients within a non-native HDFS environment.

As stated in the background, HDFS is a designed under a master/worker architecture. Each HDFS cluster consists of a single NameNode that acts as a master server that manages the file system namespace and regulates access to files by clients. A plurality of DataNodes operate as workers to the NameNode, usually configured one per node, that manage storage attached to the DataNode. Within the HDFS cluster, files are split into one or more blocks and these blocks are stored in the set of DataNodes. The NameNode controls operations like opening files, closing files, renaming files and directories, and mapping of blocks to DataNodes. The DataNodes then operate to serve read and write requests made by the clients of the HDFS. DataNodes also perform block creation, deletion, and replication based on instructions received from the NameNode.

Referring now to FIG. 1, there is illustrated an example of a native Hadoop Distributed File System in accordance with implementations of this disclosure. The illustrated example includes a client 102, a NameNode 104, and a set of DataNodes, e.g., DataNode 1, DataNode 2, DataNode 3, and DataNode "N" (wherein "N" is a positive integer greater than 3). It can be appreciated that typical HDFS cluster contains one NameNode and then any number of DataNodes depending on the needs of the installation. For example, the more data an HDFS cluster hosts, it is likely to have more DataNodes to store that data; however, it can be appreciated that not all DataNodes need employ the same amount of storage capacity.

In processing reads or writes, an HDFS Client 102 first makes a call to the NameNode 104 to determine how to proceed. For example, in the context of a write, an HDFS client 102 will cache the write data locally on the client 102 in a temporary file. When the temporary file accumulates data over a certain a threshold, the Client 102 will contact the NameNode 104 with the request to write data to the HDFS, the NameNode 104 can insert the file name into the file system and allocate data blocks in the DataNodes. For example, the NameNode may choose the primary destination for the write data, and then successive mirroring locations where the data is eventually mirrored to within the HDFS cluster. The NameNode then responds to the client with the identity of the DataNode(s) and the destination data block address(es) where the write data will be stored in the HDFS. It can be appreciated that not all of the data blocks associated with the write data be stored on the same DataNode, thus client 102 may be in contact with more than one DataNode in storing write data.

Similarly, for read requests, an HDFS client 102 will first contact the NameNode 104 to determine the DataNode and associated block addresses where the data is stored that is necessary to transact the read request. The client 102 will then contact the DataNodes reported by the NameNode 104 as hosting the data, and request the data from the associated block addresses. In both instances, HDFS read requests and HDFS write requests, an HDFS client first contacts the NameNode with the overview of their request, and then waits for the NameNode to respond with the relevant information to continue processing the request.

Figure 2:
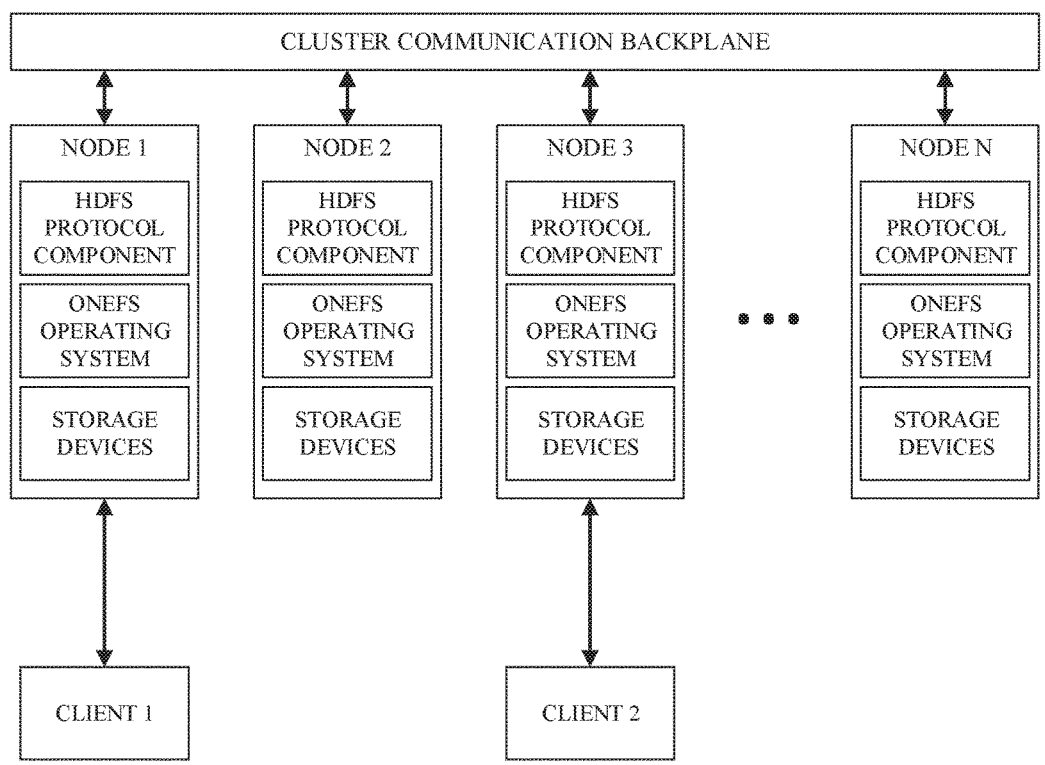
FIG. 2 illustrates an example of a non-native Hadoop Distributed File System in accordance with implementations of this disclosure.

Referring now to FIG. 2, there is illustrated an example of a non-native Hadoop Distributed File System in accordance with implementations of this disclosure. The cluster of nodes (e.g., Node 1, Node 2, Node 3, and Node N) in FIG. 2 are using OneFS operating system as sold by EMC Corporation in its product EMC Isilon. Each node, running OneFS, can communicate with individual clients and offer access to any file stored within the OneFS distributed file system. For example, Client 1 is connected to Node 1 and can ask for a file that is stored within the distributed file system. The file is associated with an inode, and Node 1, using the contents in the inode and/or data structures referenced by the inode, can determine which nodes host the data blocks that make up the file system. Node 1 can then communicate with other nodes using the cluster communication backplane to store/retrieve data to/from node 2, node 3, etc. as requested and/or needed by Client 1. Similarly, Client 2 can connect to Node 3 and ask to store/retrieve any file in the OneFS distributed file system no matter which nodes may actually store the data Client 2 may be requesting access to. In this sense, the file system depicted in FIG. 2 isn't a master/worker architecture like an HDFS file system, but rather any node can receive operations from a client and act on them immediately without having to receive a "NameNode" request and then instruct the client which DataNodes to retrieve data from.

In addition to support for standard networking protocols like SMB, NFS/CIFS, FTP, etc., the Nodes depicted in FIG. 2 also contain an HDFS protocol component. The HDFS protocol component provides for Node 1 to receive communications from Client 1 using the HDFS protocol. Thus, Client 1 can send out a NameNode request to Node 1 asking for the location (e.g., DataNodes) where the data it wishes to access is stored. The HDFS protocol component in Node 1 can receive the NameNode request; however, it can be appreciated that as every node in the cluster of nodes depicted in FIG. 2 is capable of receiving file storage requests and fulfilling them, returning to Client 1 a specific node in the cluster where the files/data is stored is unnecessary as Node 1 itself has access to all the data Client 1 may be requesting. This same example is true for Client 2 if it makes an HDFS protocol request for a file to Node 3, as Node 3, like Node 1, has access to all the data Client 2 may be requesting.

It can be appreciated that step of receiving a NameNode request from a client is likely unnecessary, as any node a client communicates with to access data stored within the distributed file system will be accessible to the client by the node it contacts. One means to increase efficiency would be to eliminate the Client's need to first send the NameNode request; however, adjusting every HDFS exchange generated by the client to remove the NameNode request could require a custom interface, a custom application programming interface, or other solutions which may increase processing time required by the client to effectuate the removal, or possibly make the communication with the cluster of node not running native HDFS less transparent.

Another means to increase efficiency would be upon receipt of any NameNode request, no matter the request, the non-native HDFS Node could return a set block address locations that are local to the Node responding to the request. For example, as stated above, HDFS files are broken up to blocks and split up among DataNodes for storage. Upon receipt of an HDFS protocol request to read a file by Node 1, Node 1 can respond that all of the parts of the file are accessible in block addresses that are local to Node 1, so that the Client 1 interacts exclusively with Node 1 in retrieving its desired data, rather than trying to contact Node 2, Node 3, etc. This example is valid even in a situation where Node 1 may not store all the data that Client 1 is requesting, as Node 1, through the cluster communications backplane, can ask for and receive necessary data from Nodes 2, 3, etc. as required to process Client 1's request.

Implementations disclosed herein provide for further efficiency while maintaining transparency to HDFS clients. A node can receive the first part in a standard two-part HDFS request where the node is treated like a NameNode by the client. In response to receiving the NameNode request that contains discriminative information related to the data being request in a read, or discriminative information related to the data being stored in a write, the non-native HDFS file system can balance the load of all nodes within the cluster of nodes.

A non-native HDFS file system operating as a cluster of nodes, as depicted in FIG. 2, can monitor each node of the cluster of nodes for active Transmission Control Protocol ("TCP") clients. For example, for each node it can be determined the amount of active TCP connections that are currently doing work. It can be appreciated that by measuring active TCP connections, TCP connections that are idle yet remain connected are not considered as many TCP connections are idle and may not have a large effect on node resource utilization. In one implementation, only active HDFS TCP connections can be accounted for.

It can be appreciated that HDFS configurations can include a replication factor that is associated with individual files and directories. A replication factor states the number of DataNodes within the HDFS cluster where file data is replicated across. Thus, if a replication factor for a file is 3, when an HDFS client makes a NameNode request asking for block data addresses of the file it wants to read, the NameNode responds with 3 DataNode locations where that data is stored. The HDFS client can then attempt to read the data at the first DataNode location, and should the operation fail or timeout, it can attempt to read the data at the second DataNode location and/or the third DataNode location until a read is successful.

In a non-native HDFS file system, protocol access to the file system can be based on access zone associated with the client. For example, HDFS clients can be associated with a single access zone or a set of access zones that are comprised of pools of IP addresses associated with the access zone. IP addresses in the pool can also be statically routed to specific known nodes among the cluster of nodes. Thus, when an HDFS NameNode request is made by an HDFS client, they can be routed to connect to a specific node among the cluster of nodes by selecting an IP address within their Access Zone pool of IP addresses that is targeted to the specific node.

In one example, upon receiving a NameNode request associated with any operation by an HDFS client, the Node receiving the request could assess the performance of the non-native HDFS distributed file system and choose a node within the cluster with the most resources to fulfill the request. One way of load balancing is to determine the set of available IP addresses within a pool of addresses associated with the access zone of the HDFS client. Each IP address is associated with a known node among the cluster of nodes. It can then be determined how many currently active HDFS TCP connections are with each node in the cluster of nodes. IP addresses in the pool associated with nodes that have high numbers of active HDFS TCP connections can be avoided and the node response the NameNode request can return to the HDFS client IP addresses targeted to less busy nodes. It can be appreciated that multiple target IP addresses can be returned back to the client based on the replication factor of the HDFS. For example, if the replication factor is three, the three IP addresses in the pool that are associated with the least busy nodes can be returned to the HDFS client. As stated above, as any HDFS data is servable from any node of the cluster of nodes, every node is a potential DataNode option for the HDFS client.

In one implementation, an HDFS client can maintain a blacklist of IP addresses that the client has had inefficient past experiences with. For example, if an HDFS client attempts to read data from an IP address and the request times out, the IP address can be added to a blacklist maintained by the HDFS client. When the HDFS clients makes future NameNode requests, the blacklist can be included in the NameNode request and IP addresses that have been blacklisted by the HDFS client can be removed from the pool of IP addresses in the HDFS client's access zone that can be potentially used as DataNode targets.

In one implementation, a TCP connection threshold can be established whereby nodes are evaluated for active TCP connection based on the TCP connection threshold. For example, the threshold could be a configurable percentile, stored as a registry key in the operating system of the non-native HDFS. The configurable percentile can relate to the number of active HDFS IP addresses being serviced by the node versus the total amount of HDFS IP addresses that are assigned to the node by the access zone.

In one implementation, when an HDFS client makes a NameNode request to a non-native HDFS, a set of IP addresses can be determined based on the access zone the client is connecting to. Individual IP addresses in the set of IP addresses can also be associated with a subnet and a rack and the set of IP addresses can be filtered to retain IP addresses in the same subnet and rack as the HDFS client. The HDFS client can also communicate a blacklist as a part of the NameNode request and the blacklisted IP addresses can be filtered from the set of IP addresses. After the set of IP addresses has been filtered based on the subnet, rack and blacklist associated with the HDFS client, remaining IP addresses can scored based on an amount of active HDFS TCP connections to the node each IP address is associated with and an active HDFS TCP connection threshold. Finally, an amount of IP addresses based on the replication factor of the HDFS can be returned to the HDFS client as DataNode locations. In one implementation, if more IP addresses pass the filtering steps than the replication factor, a random selection among those IP addresses that pass the filtering steps can be made. In one implementation, if more IP addresses pass the filtering steps than the replication factor, the IP addresses associated with nodes with the least amount of active HDFS TCP connections can be selected. It can be further appreciated that if less IP addresses pass the filtering steps than the replication factor, then IP addresses that did not pass the active HDFS TCP connection threshold can be returned such that the HDFS client still receives an amount of DataNode locations (i.e., IP addresses) that satisfy the Replication Factor of HDFS.

Figure 3:
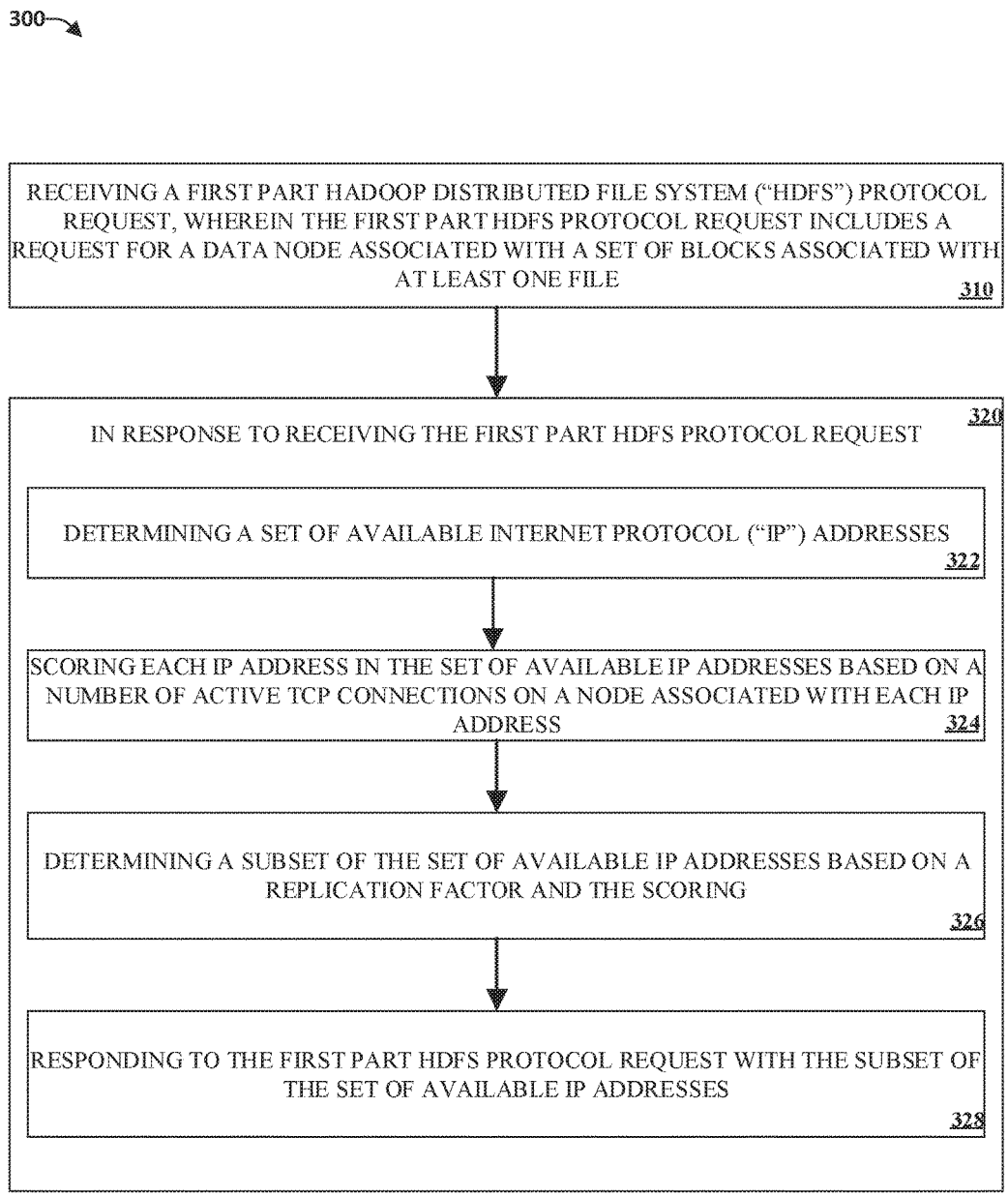
FIG. 3 illustrates an example method for using discriminative information learned from NameNode requests to more effectively load balance nodes serving HDFS clients in a non-native HDFS environment in accordance with implementations of this disclosure.
Figure 4:
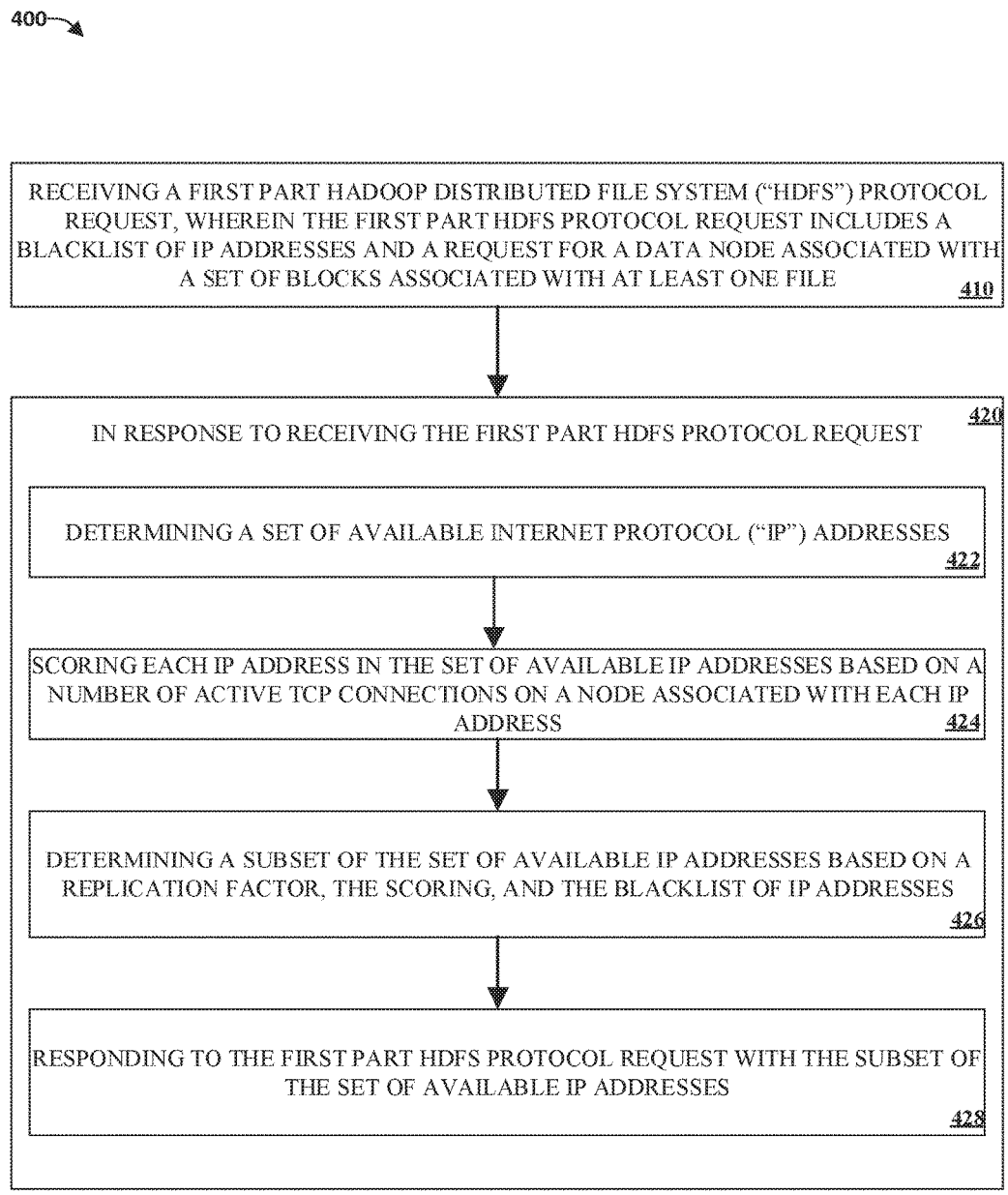
FIG. 4 illustrates an example method for using discriminative information learned from NameNode requests to more effectively load balance nodes serving HDFS clients in a non-native HDFS environment including avoiding blacklisted clients in accordance with implementations of this disclosure.

FIGS. 3-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 3 illustrates an example method for using discriminative information learned from NameNode requests to more effectively load balance nodes serving HDFS clients in a non-native HDFS environment in accordance with implementations of this disclosure.

At 310, a first part HDFS protocol request can be received, wherein the first part HDFS protocol request includes a request for a Data Node associated with asset of blocks associated with at least one file.

At 320, in response to receiving the first part HDFS protocol request, steps 322-328 can occur. At 322, a set of available IP addresses can be determined. In one implementation, the set of IP addresses are based on an access zone associated with the first part HDFS protocol request, a subnet associated with the first part HDFS protocol request, and a rack associated with the first part HDFS protocol request.

At 324, each IP address in the set of IP addresses determined at step 322 can be scored based on a number of active TCP connections on a node associated with each IP address. It can be appreciated that if two IP addresses are both associated with the same node, they may be scored identically.

At 326, a subset of the set of available IP addresses can be determined based on a replication factor and the scoring determined in step 324. In one implementation, the number of IP addresses in the subset of the set of available IP addresses is the same as the replication factor. In one implementation, determining the subset of the set of available IP addresses is based on comparing the score of each IP address to an active TCP connection threshold.

At 328, a response to the first part HDFS protocol request can be sent with the subset of the set of available IP addresses determined at step 326.

FIG. 4 illustrates an example method for using discriminative information learned from NameNode requests to more effectively load balance nodes serving HDFS clients in a non-native HDFS environment including avoiding blacklisted clients in accordance with implementations of this disclosure.

At 410, a first part HDFS protocol request can be received, wherein the first part HDFS protocol request includes a blacklist of IP addresses and a request for a Data Node associated with asset of blocks associated with at least one file.

At 420, in response to receiving the first part HDFS protocol request, steps 422-428 can occur. At 422, a set of available IP addresses can be determined.

At 424, each IP address in the set of IP addresses determined at step 422 can be scored based on a number of active TCP connections on a node associated with each IP address.

At 426, a subset of the set of available IP addresses can be determined based on a replication factor, the blacklist of IP addresses received at step 410, and the scoring determined in step 424.

At 428, a response to the first part HDFS protocol request can be sent with the subset of the set of available IP addresses determined at step 426.

Figure 5:
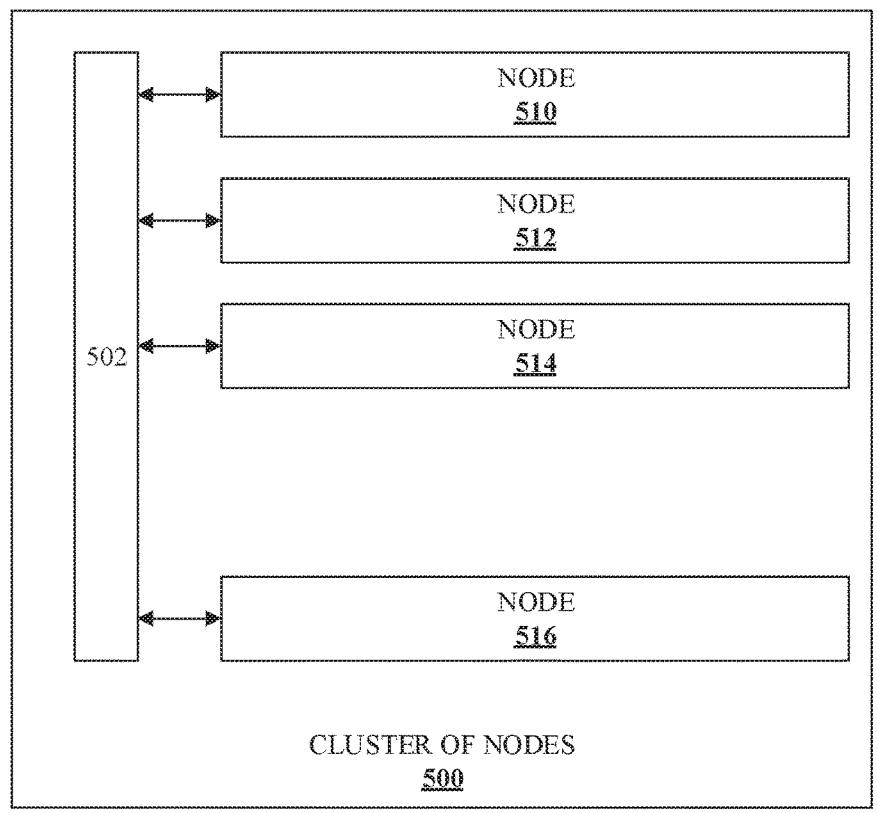
FIG. 5 illustrates an example block diagram of a cluster of nodes in accordance with implementations of this disclosure.

FIG. 5 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces. The cluster of nodes 500 as depicted shows Nodes 510, 512, 514 and 516 operating in a cluster; however, it can be appreciated that more or less nodes can make up a cluster. It can be further appreciated that nodes among the cluster of nodes do not have to be in a same enclosure as shown for ease of explanation in FIG. 5, and can be geographically disparate. Backplane 502 can be any type of commercially available networking infrastructure that allows nodes among the cluster of nodes to communicate amongst each other in as close to real time as the networking infrastructure allows.

It can be appreciated that the backplane 502 can also have a separate power supply, logic, I/O, etc. as necessary to support communication amongst nodes of the cluster of nodes.

It can be appreciated that the Cluster of Nodes 500 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 6:
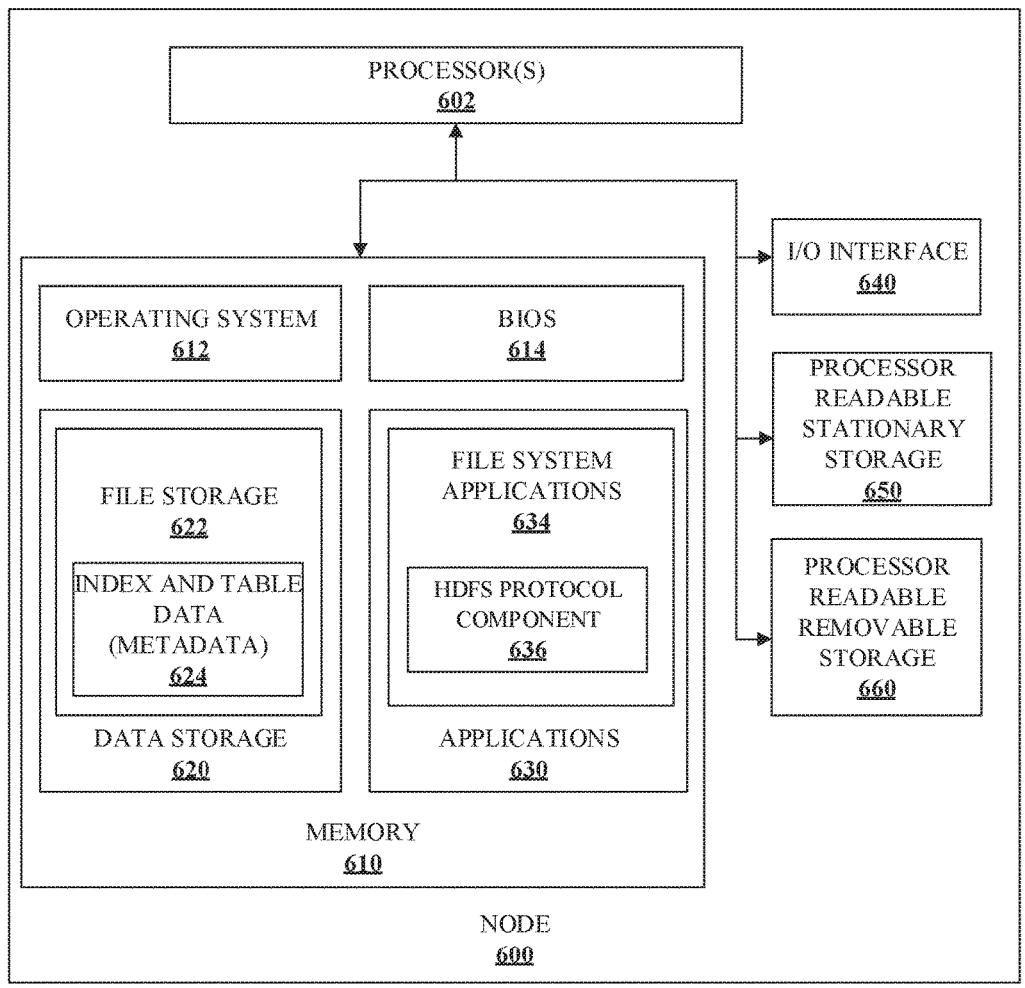
FIG. 6 illustrates an example block diagram of a node in accordance with implementations of this disclosure.

FIG. 6 illustrates an example block diagram of a node 600 in accordance with implementations of this disclosure.

Node 600 includes processor 602 which communicates with memory 610 via a bus. Node 600 also includes input/output interface 640, processor-readable stationary storage device(s) 650, and processor-readable removable storage device(s) 660. Input/output interface 640 can enable node 600 to communicate with other nodes, mobile devices, network devices, and the like. Processor-readable stationary storage device 650 may include one or more devices such as an electromagnetic storage device (hard disk), solid state hard disk (SSD), hybrid of both an SSD and a hard disk, and the like. In some configurations, a node may include many storage devices. Also, processor-readable removable storage device 660 enables processor 602 to read non-transitive storage media for storing and accessing processor-readable instructions, modules, data structures, and other forms of data. The non-transitive storage media may include Flash drives, tape media, floppy media, disc media, and the like.

Memory 610 may include Random Access Memory (RAM), Read-Only Memory (ROM), hybrid of RAM and ROM, and the like. As shown, memory 610 includes operating system 612 and basic input/output system (BIOS) 614 for enabling the operation of node 600. In various embodiments, a general-purpose operating system may be employed such as a version of UNIX, LINUX™, a specialized server operating system such as Microsoft's Windows Server™ and Apple Computer's IoS Server™, or the like.

Applications 630 may include processor executable instructions which, when executed by node 600, transmit, receive, and/or otherwise process messages, audio, video, and enable communication with other networked computing devices. Examples of application programs include database servers, file servers, calendars, transcoders, and so forth. Applications 630 may include, for example, file system applications 634, and an HDFS protocol component 636 according to implementations of this disclosure. It can be appreciated that HDFS protocol component 636 can store information in memory 610 such as in a cache or the like for use during prefetch operations as discussed supra.

Human interface components (not pictured), may be remotely associated with node 600, which can enable remote input to and/or output from node 600. For example, information to a display or from a keyboard can be routed through the input/output interface 640 to appropriate peripheral human interface components that are remotely located. Examples of peripheral human interface components include, but are not limited to, an audio interface, a display, keypad, pointing device, touch interface, and the like.

Data storage 620 may reside within memory 610 as well, storing file storage 622 data such as metadata or LIN data. It can be appreciated that LIN data and/or metadata can relate to rile storage within processor readable stationary storage 650 and/or processor readable removable storage 660. For example, LIN data may be cached in memory 610 for faster or more efficient frequent access versus being stored within processor readable stationary storage 650. In addition, Data storage 620 can also host index and table data 624 such as cursor data in accordance with implementations of this disclosure. Index and table data can be stored as files in file storage 622.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    receiving a first part Hadoop Distributed File System ("HDFS") Protocol request by a first node among a cluster of nodes operating as a non-native HDFS, wherein all nodes among the cluster of nodes are capable of receiving the first part HDFS Protocol request, wherein the HDFS Protocol request includes a HDFS NameNode request, wherein the cluster of nodes are associated with an access zone, wherein the first node is configured to send the HDFS NameNode request to a predetermined node within the cluster of nodes configured to process the HDFS Protocol request, wherein the first part HDFS protocol request includes a request for a Data Node associated with a set of blocks associated with at least one file, and wherein all nodes within the cluster of nodes can serve the set of blocks;
    in response to receiving the first part HDFS protocol request:
        determining a set of available internet protocol ("IP") addresses;
        scoring each IP address in the set of available IP addresses based on a number of active TCP connections on a node associated with each IP address;
        determining a subset of the set of available IP addresses based on a replication factor and the scoring; and
        responding to the first part HDFS protocol request with the subset of the set of available IP addresses.

2. The method of claim 1, wherein the set of available IP addresses are based on an access zone associated with the first part HDFS protocol request, a subnet associated with the first part HDFS protocol request, and a rack associated with the first part HDFS protocol request.

3. The method of claim 1, further comprising:
    receiving a blacklist of IP addresses within the first part HDFS protocol request, wherein the determining the subset of the set of available IP addresses is further based on the blacklist of IP addresses.

4. The method of claim 3, wherein the determining the subset of the set of available IP addresses first removes the blacklist of IP addresses from the set of available IP addresses.

5. The method of claim 1, wherein a number of IP addresses in the subset of the set of available IP addresses is the same as the replication factor.

6. The method of claim 1, wherein the determining the subset of the set of available IP addresses is based on comparing the score of each IP address to an active TCP connection threshold.

7. A system comprising at least one node in a cluster of nodes operating as a non-native HDFS, wherein the at least one node comprises at least one storage device and at least one hardware processor configured to:
    receive a first part Hadoop Distributed File System ("HDFS") Protocol request by a first node among the cluster of nodes, wherein the at least one nodes are all capable of receiving the first part HDFS Protocol request, wherein the HDFS Protocol request includes a HDFS NameNode request, wherein the cluster of nodes are associated with an access zone, wherein the first node is configured to send the HDFS NameNode request to a predetermined node within the cluster of nodes configured to process the HDFS Protocol request, wherein the first part HDFS protocol request includes a request for a Data Node associated with a set of blocks associated with at least one file, and wherein the at least one nodes are all capable of serving the set of blocks;
    in response to receiving the first part HDFS protocol request:
        determine a set of available internet protocol ("IP") addresses;
        scoring each IP address in the set of available IP addresses based on a number of active TCP connections on a node associated with each IP address;
        determine a subset of the set of available IP addresses based on a replication factor and the scoring; and
        respond to the first part HDFS protocol request with the subset of the set of available IP addresses.

8. The system of claim 7, wherein the set of available IP addresses are based on an access zone associated with the first part HDFS protocol request, a subnet associated with the first part HDFS protocol request, and a rack associated with the first part HDFS protocol request.

9. The system of claim 7, further configured to:
receive a blacklist of IP addresses within the first part HDFS protocol request, wherein the determining the subset of the set of available IP addresses is further based on the blacklist of IP addresses.

10. The system of claim 9, wherein the determining the subset of the set of available IP addresses first removes the blacklist of IP addresses from the set of available IP addresses.

11. The system of claim 7, wherein a number of IP addresses in the subset of the set of available IP addresses is the same as the replication factor.

12. The system of claim 7, wherein the determining the subset of the set of available IP addresses is based on comparing the score of each IP address to an active TCP connection threshold.

13. A non-transitory computer readable medium with program instructions stored thereon to perform the following acts:
receiving a first part Hadoop Distributed File System ("HDFS") Protocol request by a first node among the cluster of nodes operating as a non-native HDFS, wherein all nodes among the cluster of nodes are capable of receiving the first part HDFS Protocol request, wherein the HDFS Protocol request includes a HDFS NameNode request, wherein the cluster of nodes are associated with an access zone, wherein the first node is configured to send the HDFS NameNode request to a predetermined node within the cluster of nodes configured to process the HDFS Protocol request, wherein the first part HDFS protocol request includes a request for a Data Node associated with a set of blocks associated with at least one file, and wherein all nodes within the cluster of nodes can serve the set of blocks;

in response to receiving the first part HDFS protocol request:
determining a set of available internet protocol ("IP") addresses;
scoring each IP address in the set of available IP addresses based on a number of active TCP connections on a node associated with each IP address;
determining a subset of the set of available IP addresses based on a replication factor and the scoring; and
responding to the first part HDFS protocol request with the subset of the set of available IP addresses.

14. The non-transitory computer readable medium of claim 13, wherein the set of available IP addresses are based on an access zone associated with the first part HDFS protocol request, a subnet associated with the first part HDFS protocol request, and a rack associated with the first part HDFS protocol request.

15. The non-transitory computer readable medium of claim 13 with program instructions stored thereon to further perform the following acts:
receiving a blacklist of IP addresses within the first part HDFS protocol request, wherein the determining the subset of the set of available IP addresses is further based on the blacklist of IP addresses.

16. The non-transitory computer readable medium of claim 15, wherein the determining the subset of the set of available IP addresses first removes the blacklist of IP addresses from the set of available IP addresses.

17. The non-transitory computer readable medium of claim 13, wherein a number of IP addresses in the subset of the set of available IP addresses is the same as the replication factor.

18. The non-transitory computer readable medium of claim 13, wherein the determining the subset of the set of available IP addresses is based on comparing the score of each IP address to an active TCP connection threshold.

* * * * *